United States Patent [19]

Takahashi et al.

[11] Patent Number: 5,364,690
[45] Date of Patent: Nov. 15, 1994

[54] MAGNETIC RECORDING MEDIUM COMPRISING A FERROMAGNETIC METAL FILM AND TWO CARBON PROTECTIVE LAYERS

[75] Inventors: Kiyoshi Takahashi, Ibaraki; Mikio Murai, Hirakata; Masaru Odagiri, Kawanishi; Hideyuki Ueda, Takatsuki; Yukikazu Ohchi, Kadoma; Tatsuya Hiwatashi, Kumamoto, all of Japan

[73] Assignee: Matsushita Electric Industrial Co., Ltd., Osaka, Japan

[21] Appl. No.: 964,861

[22] Filed: Oct. 22, 1992

[30] Foreign Application Priority Data

Oct. 25, 1991 [JP] Japan .................. 3-279198

[51] Int. Cl.$^5$ .............................................. G11B 5/00
[52] U.S. Cl. .................... 428/212; 428/216; 428/217; 428/336; 428/408; 428/694 TC; 428/900
[58] Field of Search ............ 428/212, 216, 217, 336, 428/408, 694, 900, 694 TC

[56] References Cited

U.S. PATENT DOCUMENTS

| | | | |
|---|---|---|---|
| 4,717,622 | 1/1988 | Kurokawa et al. | 428/408 |
| 4,778,582 | 10/1988 | Howard | 204/192.15 |
| 4,877,677 | 10/1989 | Hirochi et al. | 428/216 |
| 5,045,165 | 9/1991 | Yamashita | 204/192.16 |
| 5,069,967 | 12/1991 | Yokoyama et al. | 428/336 |
| 5,110,676 | 5/1992 | Murai et al. | 428/336 |

FOREIGN PATENT DOCUMENTS 62-241124 10/1987 Japan .

OTHER PUBLICATIONS

Abstract: JP-A-3-130919 (Jun. 4, 1991).
Abstract: JP-A-62-183022 (Aug. 11, 1987).
Abstract: JP-A-62-159331 (Jul. 15, 1987).

*Primary Examiner*—Stevan A. Resan
*Attorney, Agent, or Firm*—Wenderoth, Lind & Ponack

[57] ABSTRACT

A magnetic recording medium comprising: a non-magnetic substrate; a ferromagnetic metal thin film provided on the non-magnetic substrate; a filmlike first carbon layer provided on the ferromagnetic metal thin film; and a hard and amorphous second carbon layer provided on the first carbon layer; the first and second carbon layers having first and second Raman spectra based on Raman spectrophotometry, respectively; assuming that when each of the first and second Raman spectra is decomposed into a first band of Gaussian function having a peak in the vicinity of 1380 cm$^{-1}$ and a second band of Gaussian function having a peak in the vicinity of 1550 cm$^{-1}$ in X-Y rectangular coordinates with an X-axis expressed in cm$^{-1}$ and a Y-axis indicative of spectral intensity, a ratio of an area enclosed by the first band and the X-axis to an area enclosed by the second band and the X-axis represents "relative intensity", the first carbon layer has a relative intensity of 2 to 20, while the second carbon layer has a relative intensity of 0.8 to 3, a Vickers hardness of not less than 1,000 kg/mm$^2$ and a thickness of 50 to 300 Å.

2 Claims, 6 Drawing Sheets

MAGNETIC RECORDING MEDIUM COMPRISING A FERROMAGNETIC METAL FILM AND TWO CARBON PROTECTIVE LAYERS

BACKGROUND OF THE INVENTION

The present invention generally relates to a ferromagnetic metal type magnetic recording medium and more particularly, to a magnetic recording medium in which performance of a hard carbon film provided, after formation of a magnetic layer, as a protective film for improving practical performance can be maximized.

In ferromagnetic metal type magnetic recording mediums produced by a process in which by a film forming method under vacuum such as vacuum deposition, sputtering, ion plating, etc., Co, Ni or Fe or an alloy mainly consisting of Co, Ni and Fe is formed on a substrate made of polymeric film such as polyester, polyimide, etc. or non-magnetic metal, recording density can be raised remarkably in comparison with known coating type magnetic recording mediums.

Meanwhile, in order to raise recording density, it is prerequisite to minimize not only recording and reproducing defects but spacing loss between a magnetic head and the magnetic recording medium. In addition, the magnetic recording medium is required to have durability. In order to satisfy these requirements, a procedure is known in which after formation of a magnetic layer, a hard amorphous carbon film acting as a protective film and a lubricant layer are provided on the magnetic layer. More concretely, Japanese Patent Laid-Open Publication No. 1-245417 (1989) proposes an arrangement in which a plasma-polymerized film is provided on a ferromagnetic metal thin film prior to formation of a hard carbon film, while Japanese Patent Laid-Open Publication No.3-19122 (1991) discloses that a graphite layer is provided on a ferromagnetic metal thin film. Furthermore, Japanese Patent Laid-Open Publication Nos. 3-83224(1991), 3-116520 (1991), etc. teach that a metallic carbide layer or a metallic layer having discontinuous crystalline structure is provided on a ferromagnetic metal thin film.

However, in the prior art arrangements in which the plasma-polymerized film or the graphite layer is provided on the ferromagnetic metal thin film, it is impossible to obtain excellent adhesive property between the metal thin film and the hard carbon film. As a result, if these known arrangements referred to above are employed in a magnetic tape and a hard disk, durability of the magnetic tape is poor, while the hard disk has such a drawback that the hard carbon film is peeled from the metal thin film.

Meanwhile, in the known arrangements in which the metallic carbide layer or the metallic layer having discontinuous crystalline structure is provided on the ferromagnetic metal thin film, the metal or the metal carbide is sputtered during formation of the hard carbon film so as to be drawn into the hard carbon film and thus, is agglutinated to the magnetic head. In case the known arrangements are employed in a magnetic tape and a hard disk, output of the magnetic tape drops at the time of recording and reproduction, while head crush occurs in the hard disk.

SUMMARY OF THE INVENTION

Accordingly, an essential object of the present invention is to provide, with a view to eliminating the above mentioned inconveniences of the prior art, a magnetic recording medium in which adhesive property between a ferromagnetic metal thin film and a hard carbon film is improved and metal, etc. are prevented from being drawn into the hard carbon film during formation of the hard carbon film.

In order to accomplish this object of the present invention, a magnetic recording medium according to the present invention comprises: a non-magnetic substrate; a ferromagnetic metal thin film which is provided on the non-magnetic substrate; a first carbon layer which is filmlike or granular and is provided on the ferromagnetic metal thin film; and a second carbon layer which is amorphous and hard and is provided on the first carbon layer.

By the above mentioned arrangement of the magnetic recording medium of the present invention, adhesive strength between the ferromagnetic metal thin film and the hard and amorphous second carbon layer is increased and metal, etc. are prevented from being drawn into the second carbon layer. Therefore, in a practical performance test of a magnetic tape in a video tape recorder, the magnetic tape has long still frame life serving as a yardstick of its durability.

Meanwhile, since metal, etc. are not drawn into the second hard amorphous carbon layer, agglutination of metal, etc. to a magnetic head does not take place. As a result, drop of output at the time of recording and reproduction is reduced remarkably.

In addition, in case the present invention is applied to a hard disk, the second hard amorphous carbon is not peeled from the metal thin film and agglutination of metal, etc. to the magnetic head does not occur. Therefore, in a contact-start-and-stop (CSS) test, head crush does not happen and performance of the hard disk can be maintained for a long time.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
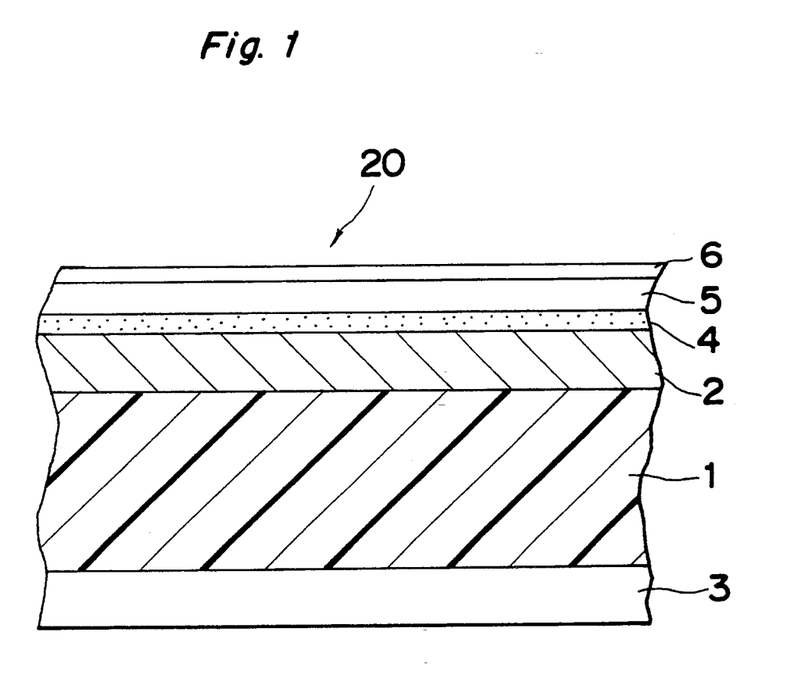
FIG. 1 is a fragmentary schematic sectional view of a magnetic tape according to a first embodiment of the present invention.

Referring now to the drawings, there is shown in FIG. 1, a magnetic tape 20 according to a first embodiment of the present invention. The magnetic tape 20 includes a non-magnetic substrate 1, a ferromagnetic metal thin film 2 provided on one face of the substrate 1, a back coating layer 3 provided on the other face of the substrate 1, a filmlike or granular first carbon layer 4 provided on the metal thin film 2, a hard and amorphous second carbon layer 5 provided on the first carbon layer 4 and a lubricant layer 6 provided on the second carbon layer 5.

The substrate 1 has a thickness of 3 to 20 $\mu$m and is formed by a polyester film. The metal thin film 2 has a thickness of 0.1 to 0.2 $\mu$m and is formed by rhombic deposition of a Co-Ni alloy through introduction of oxygen. The back coating layer 3 is formed by applying a mixture of polyester resin, carbon, etc. to the substrate 1. The first carbon layer 4 is produced by a film forming method under vacuum such as sputtering, plasma chemical vapor deposition (CVD), etc. The second carbon layer 5 is formed by plasma CVD, etc. The lubricant layer 6 is formed by a wet coating method or vacuum deposition.

Figure 2:
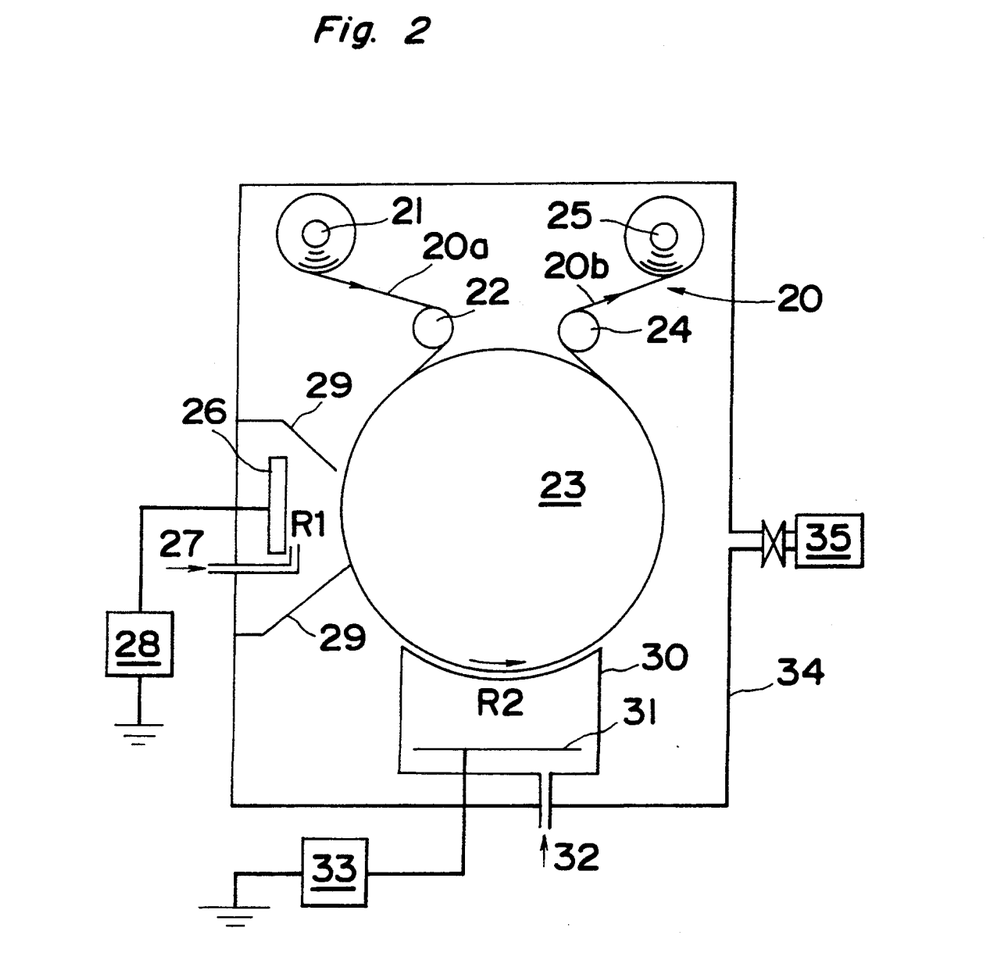
FIG. 2 is a schematic view of an apparatus for producing the magnetic tape of FIG. 1.

Meanwhile, FIG. 2 shows an apparatus for producing the magnetic tape 20 of FIG. 1. The apparatus includes a vacuum tank 34 coupled with a vacuum pump 35. In FIG. 2, reference numeral 20a denotes a magnetic tape in which the ferromagnetic metal thin film 2 is provided on the non-magnetic substrate 1, while reference numeral 20b denotes a magnetic tape in which the first and second carbon layers 4 and 5 are formed on the metal thin film 2. The magnetic tape 20a is wound around a supply roller 21 and is fed from the supply roller 21 through adjustment of tension of the magnetic tape 20a. Pass rollers 22 are rotated in contact with the magnetic tape 20. A main roller 23 is electrically insulated from an apparatus body of the apparatus and is grounded through refrigerant or the like. Rotation of the main roller 23 is controlled such that the magnetic tape 20 can be transported at a fixed speed. A take-up roller 25 is provided for taking up the magnetic tape 20b continuously. In the same manner as the magnetic tape 20a, tension of the magnetic tape 20b is also adjusted.

The apparatus has a first region R1 for forming the first carbon layer 4 and a second region R2 for forming the second carbon layer 5. The first region R1 has a chamber enclosed by a partition plate 29. In the first region R1, a sputtering target 26 is connected to a sputtering power source 28. Based on DC, AC of 50 Hz to 30 MHz or combination of DC and AC, the sputtering power source 28 is capable of applying a maximum voltage of $-7$ kV to the sputtering target 26. Pressure in the chamber of the first region R1 can be controlled in accordance with quantity of gas introduced thereinto from a gas inlet 27. If reactive gas of hydrocarbon is introduced into the chamber from the gas inlet 27, the elements 26 to 29 can be also used as a plasma CVD apparatus. The filmlike or granular first carbon layer 4 is formed by the elements 26 to 29.

Meanwhile, in the second region R2, a plasma nozzle 30 for forming the hard and amorphous second carbon layer 5 accommodates an electrode 31 for generating plasma. The electrode 31 is connected to a power source 33. Based on DC, AC of 50 Hz to 30 MHz or combination of DC and AC, the power source 33 is capable of applying a voltage of 0.05 to 7 kV to the electrode 31. Raw material gas such as reactive gas of $H_2$, Ar, or hydrocarbon or vaporized gas of ketone or alcohol, etc. is introduced into the plasma nozzle 30 from a gas inlet 32 at a partial pressure of 0.5 to 0.001 Torr. A plasma CVD apparatus is constituted by the elements 30 to 33.

Operation of the apparatus of the above described arrangement is described with reference to FIG. 2. Initially, the vacuum tank 34 is evacuated to a predetermined degree of vacuum by the vacuum pump 35. Then, the magnetic tape 20a in which the ferromagnetic metal thin film 2 is formed is held in close contact with the main roller 23 so as to be continuously fed from the supply roller 21 towards the take-up roller 25. When the magnetic tape 20a is transported to the first region R1 for forming the first carbon layer 4, carbon of the sputtering target 26 is sputtered towards the magnetic tape 20a by voltage from the sputtering power source 28 and Ar gas from the gas inlet 27. Therefore, the carbon molecules reach the metal thin film 2 and thus, the first carbon layer 4 is formed on the metal thin film 2. Since the first carbon layer 4 reaches the ferromagnetic metal thin film 2 at high energy, the first carbon layer 4 not only is chemically bonded to the ferromagnetic metal thin film 2 partially but is mechanically bonded to the ferromagnetic metal thin film 2 strongly. By introducing reactive gas into the chamber of the first region R1, the first carbon layer 4 can also be formed based on plasma CVD.

Subsequently, when the magnetic tape 20a is conveyed to the second region R2 for forming the hard and amorphous second carbon layer 5, ion current of plasma is generated and accelerated from the electrode 31 by raw material gas from the gas inlet 32 and voltage applied from the power source 33 and reaches the first carbon layer 4 on the metal thin film 2, which confronts the electrode 31 and thus, the hard and amorphous second carbon layer 5 is formed on the first carbon layer 4. Since the filmlike or granular first carbon layer 4 and the hard and amorphous second carbon layer 5 are chemically bonded to each other in carbon, the second carbon layer 5 is bonded to the metal thin film 2 quite strongly through the first carbon layer 4. Therefore, in practical performance of the magnetic tape 20, the still frame life is increased greatly. Furthermore, since metal is not drawn into the hard and amorphous second carbon layer 5, agglutination of metal to a magnetic head does not take place and thus, drop of output at the time of recording and reproduction is lessened remarkably.

Meanwhile, in the magnetic tape 20 used in the practical performance test, a polyester film of about 10 $\mu$m in thickness is used as the non-magnetic substrate 1, while the ferromagnetic metal thin film 2 has a thickness of about 1800 Å and is mainly made of Co. Meanwhile, a filmlike carbon layer having a relative intensity of 1.8 to 25 in Raman spectrum, a Vickers hardness of 40 to 1100 kg/mm$^2$ and a thickness of 4 to 350 Å or a granular carbon layer having a particle size of 15 to 350 Å, a relative intensity of 1.8 to 20 in Raman spectrum, a Vickers hardness of 80 to 1100 kg/mm$^2$ and a thickness of 20 to 400 Å is employed as the first carbon layer 4. The term "relative intensity in Raman spectrum" will be described in detail later with reference to FIGS. 5 and 6. These characteristics of the first carbon layer 4 such as filmlike or granular form, particle size, relative intensity in Raman spectrum and Vickers hardness are obtained by changing such conditions as pressure in the chamber of the first region R1, voltage of the sputtering power source 28, distance between the sputtering target 26 and the magnetic tape 20, temperature of the main roller 23 for supporting the magnetic tape 20, etc. Furthermore, the hard and amorphous second carbon layer 5 has a relative intensity of about 1.2 in Raman spectrum, a Vickers hardness of 800 to 4000 kg/mm$^2$ and a thickness of 30 to 300 Å. In addition, the lubricant layer 6 has a thickness of about 30 Å and is made of carboxylic acid containing fluorine.

Effects of the magnetic tape 20 of the present invention are described with reference to Tables 1 to 3 in which by using a video tape recorder, practical performance regarding still frame life and output drop in low-humidity environment are evaluated for samples 1 to 20 of the magnetic tape 20 and magnetic tapes of comparative examples 1 to 4.

TABLE 1

| Sample No. | a | b (kg/mm$^2$) | c (Å) | d (min.) | e (dB) |
|---|---|---|---|---|---|
| 1 | 25 | 40 | 60 | 15 | −2.5 |
| 2 | 20 | 50 | 60 | 30 | −1.5 |
| 3 | 15 | 50 | 60 | 30 | −1.5 |
| 4 | 15 | 100 | 60 | 45 | −1.5 |
| 5 | 10 | 300 | 60 | 60 | −1.5 |
| 6 | 10 | 600 | 60 | 90 | −1.0 |
| 7 | 4 | 300 | 60 | 90 | −1.0 |
| 8 | 4 | 600 | 4 | 20 | −0.5 |
| 9 | 4 | 600 | 5 | 90 | −0.5 |
| 10 | 4 | 600 | 30 | >180 | −1.0 |
| 11 | 4 | 600 | 60 | >180 | −1.0 |
| 12 | 4 | 600 | 150 | 120 | −1.0 |
| 13 | 4 | 600 | 300 | 60 | −1.0 |
| 14 | 4 | 600 | 350 | 30 | −1.0 |
| 15 | 4 | 800 | 60 | >180 | −1.0 |
| 16 | 2 | 800 | 60 | >180 | −1.0 |
| 17 | 2 | 1,000 | 60 | 60 | −1.5 |
| 18 | 2 | 1,100 | 60 | 20 | −2.0 |
| 19 | 1.8 | 1,000 | 60 | 20 | −2.0 |
| 20 | 1.8 | 1,100 | 60 | 10 | −2.5 |

In Table 1 above, characters a, b and c denote approximate values of relative intensity in Raman spectrum, Vickers hardness and thickness of the filmlike first carbon layer 4, respectively. Meanwhile, character d denotes still frame life of the magnetic tape under threefold load at 23° C. and a humidity of 10% and character e denotes output drop of the magnetic tape at 23° C. and a humidity of 70%.

In Table 1, samples 1 to 20 of the present invention include the filmlike first carbon layer 4 having a relative intensity of 1.8 to 25 in Raman spectrum, a Vickers hardness of 40 to 1,100 kg/mm$^2$ and a thickness of 4 to 350 Å and the hard and amorphous second carbon layer 5 having a relative intensity of about 1.2 in Raman spectrum, a Vickers hardness of about 2,500 kg/mm$^2$ and a thickness of about 100 Å. In the magnetic tape 20, relative intensity in Raman spectrum and Vickers hardness cannot be greatly changed owing to slight interrelation therebetween and thus, are changed in a permissible range.

TABLE 2

| Comparative example No. | b (kg/mm$^2$) | c (Å) | d (min.) | e (dB) |
|---|---|---|---|---|
| 1 | <150 | 60 | 30 | −3 |
| 2 | <200 | 60 | 10 | −3 |
| 3 | 1,500 | 60 | 20 | −6 |
| 4 | <150 | 60 | 10 | ≧−10 |

In the magnetic tapes of the comparative examples 1 to 4 in Table 2 above, the first carbon layer 4 of the present invention is replaced by a plasma-polymerized film, a layer made of graphite, a layer made of metal carbide and a layer made of metal having discontinuous crystalline structure, respectively each having a thickness of 60 Å but the hard and amorphous second carbon layer 5 and the lubricant layer 6 are provided in the same manner as in the magnetic tape 20 of the present invention.

TABLE 3

| Sample No. | f (Å) | a | b (kg/mm$^2$) | c (Å) | d (min.) | e (dB) |
|---|---|---|---|---|---|---|
| 21 | 15 | 4 | 600 | 20 | 10 | −0.5 |
| 22 | 20 | 4 | 600 | 30 | 30 | −0.5 |
| 23 | 30 | 4 | 600 | 40 | 45 | −0.5 |
| 24 | 30 | 2 | 800 | 40 | 60 | −1.0 |
| 25 | 50 | 20 | 80 | 60 | 20 | −1.5 |
| 26 | 50 | 15 | 80 | 60 | 30 | −1.0 |
| 27 | 50 | 15 | 100 | 60 | 60 | −1.0 |
| 28 | 50 | 10 | 300 | 60 | 90 | −1.5 |
| 29 | 50 | 4 | 300 | 60 | 120 | −1.0 |
| 30 | 50 | 4 | 600 | 50 | >180 | −1.0 |
| 31 | 50 | 4 | 600 | 100 | >180 | −1.0 |
| 32 | 50 | 4 | 600 | 200 | >180 | −1.0 |
| 33 | 50 | 4 | 600 | 300 | 120 | −1.5 |
| 34 | 50 | 4 | 600 | 350 | 30 | −2.0 |
| 35 | 50 | 4 | 800 | 60 | >180 | −1.5 |
| 36 | 50 | 4 | 800 | 200 | 120 | −2.0 |
| 37 | 50 | 2 | 600 | 60 | 120 | −1.5 |
| 38 | 50 | 2 | 800 | 60 | 90 | −1.5 |
| 39 | 50 | 2 | 1,000 | 60 | 30 | −2.0 |
| 40 | 50 | 2 | 1,100 | 60 | 20 | −2.0 |
| 41 | 50 | 1.8 | 800 | 60 | 20 | −1.5 |
| 42 | 50 | 1.8 | 1,000 | 60 | 15 | −2.0 |
| 43 | 50 | 1.8 | 1,100 | 60 | 10 | −2.5 |
| 44 | 100 | 4 | 600 | 120 | >180 | −1.5 |
| 45 | 200 | 4 | 600 | 250 | >180 | −2.0 |
| 46 | 300 | 4 | 600 | 350 | 120 | −3.0 |
| 47 | 300 | 4 | 600 | 400 | 120 | −3.5 |
| 48 | 350 | 4 | 600 | 400 | 90 | −4.5 |

In Table 3 above, characters a to e denote the same items as those of Table 1 and character f denotes an approximate value of particle size of the granular first carbon layer 4. Thus, in Table 3, samples 21 to 48 of the present invention include the granular first carbon layer 4 having a particle size of about 15 to 350 Å, a relative intensity of about 1.8 to 20 in Raman spectrum, a Vickers hardness of 80 to 1,100 kg/mm$^2$ and a thickness of about 20 to 400 Å and the hard and amorphous second carbon layer 5 having a relative intensity of about 1.2 in Raman spectrum, a Vickers hardness of about 2,500 kg/mm$^2$ and a thickness of about 100 Å.

Hereinbelow, a method of evaluating practical performance of the magnetic tape is described. As a concrete method of evaluating still frame life of the magnetic tape, a section measuring about 10 m in length and 8 mm in width is cut from the magnetic tape 20. Then, the section is caused to run at a speed of 14 mm/sec. such that video signals are recorded on the section at a relative speed of 3.8 m/sec. and at a track pitch of about 20 μm in an environment having a temperature of 23° C. and a humidity of 70% by using a rotary cylinder type video tape recorder in which two pairs of magnetic heads are mounted on a rotary cylinder having an outside diameter of 40 mm so as to project through 30 μm from the rotary cylinder. Subsequently, when still frame life of the magnetic tape is measured, a load about three times that of ordinary running of the magnetic tape is applied to the section in an environment having a temperature of 23° C. and a humidity of 10%. Still frame life of the magnetic tape 20 is measured at the time when no output of the magnetic tape 20 is yielded due to spread of flaws up to the metal thin film 2 of the magnetic tape 20.

Meanwhile, in a method of evaluating drop of output of the magnetic tape 20, recording on the magnetic tape 20 having a recording capacity of about 30 min. is performed by using the same video tape recorder as that for measuring still frame life of the magnetic tape 20 and reproduction on the magnetic tape 20 is performed in an environment having a temperature of 23° C. and a humidity of 70%. Then, when output of the magnetic tape 20 at the beginning of reproduction is set to 0 dB, output drop of the magnetic tape 20 is defined as a value of a minimum output of the magnetic tape 20 during 100 reproduction cycles of the magnetic tape 20.

It will be seen from Tables 1 and 2 that still frame life of the magnetic tape 20 of the present invention is superior to those of the magnetic tapes of the comparative examples 1 to 4 when the filmlike first carbon layer 4 of the magnetic tape 20 has a relative intensity of 2 to 20 in Raman spectrum, a Vickers hardness of 50 to 1,000 kg/mm$^2$ and a thickness of 5 to 300 Å. Meanwhile, in comparison with the magnetic tapes of the comparative examples 1 to 4, output drop of the magnetic tape 20 of the present invention is improved over the entire region but exhibits the most excellent value when the filmlike first carbon layer 4 has approximately a relative intensity of 4 in Raman spectrum and a Vickers hardness of 600 kg/mm$^2$.

Consequently, in the magnetic tape 20 of Table 1, it is preferable that the filmlike first carbon layer 4 has a relative intensity of 2 to 20, a Vickers hardness of 50 to 1,000 kg/mm$^2$ and a thickness of 5 to 100 Å. Meanwhile, when allowance of still frame life of the magnetic tape 20, spacing loss due to the protective film, etc. are taken into consideration, it is more preferable that the filmlike first carbon layer 4 has a relative intensity of 2 to 15 in Raman spectrum, a Vickers hardness of 300 to 800 kg/mm$^2$ and a thickness of 5 to 150 Å.

Meanwhile, it is understood from Table 3 that still frame life of the magnetic tape 20 is excellent when the granular first carbon layer 4 of the magnetic tape 20 has a particle size of 20 to 300 Å, a relative intensity of 2 to 15 in Raman spectrum and a Vickers hardness of 300 to 1,000 kg/mm$^2$. Furthermore, Table 3 indicates that output drop of the magnetic tape 20 deteriorates when the granular first carbon layer 4 has a particle size of not less than 300 Å and a thickness of not less than 350 Å.

Consequently, in the magnetic tape 20 of Table 3, it is preferable that the granular first carbon layer 4 has a particle size of 20 to 300 Å, a relative intensity of 2 to 15 in Raman spectrum, a Vickers hardness of 100 to 1,000 kg/mm$^2$ and a thickness of 30 to 350 Å. Meanwhile, when allowance of still frame life of the magnetic tape 20, value of output drop of the magnetic tape 20, a spacing loss due to the protective film, etc. are taken into consideration, it is more preferable that the granular first carbon layer 4 has a particle size of 30 to 200 Å, a relative intensity of 2 to 10 in Raman spectrum, a Vickers hardness of 300 to 800 kg/mm$^2$ and a thickness of 30 to 150 Å.

Meanwhile, relative intensity in Raman spectrum and hardness of the filmlike or granular first carbon layer 4 should be set such that the first carbon layer 4 has active points enabling chemical bonding between the first carbon layer 4 and the hard and amorphous second carbon layer 5 at the time of formation of the second carbon layer 5 on the first carbon layer 4. It is surmised that when relative intensity in Raman spectrum of the first carbon layer 4 is not more than 2 or Vickers hardness of the first carbon layer 4 exceeds 1,000 kg/mm$^2$, stability of surface of the first carbon layer 4 is improved, thereby resulting in drop of adhesive strength of the first carbon layer 4.

From the foregoing, since the first carbon layer 4 reaches the metal thin film 2 at high energy, the first carbon layer 4 not only is chemically bonded to the ferromagnetic metal thin film 2 partially but is mechanically bonded to the ferromagnetic metal thin film 2 strongly. Meanwhile, since the first carbon layer 4 and the hard and amorphous second carbon layer 5 are chemically bonded to each other in carbon, the second carbon layer 5 is bonded to the metal thin film 2 quite strongly through the first carbon layer 4. As a result, in practical performance of the magnetic tape, still frame life of the magnetic tape is increased. Furthermore, since metal is not drawn into the hard and amorphous second carbon layer 4, agglutination of metal to the magnetic head does not take place and thus, output drop at the time of recording and reproduction is improved remarkably.

In the samples 1 to 48 of Tables 1 and 3, the hard and amorphous second carbon layer 5 has a relative intensity of about 1.2 in Raman spectrum, a Vickers hardness of about 2,500 kg/mm$^2$ and a thickness of about 100 Å but it is desirable that the second carbon layer 5 has a relative intensity of 0.8 to 3 in Raman spectrum, a rickets hardness of 1,000 kg/mm$^2$ or more and a thickness of 70 to 200 Å.

Figure 3:
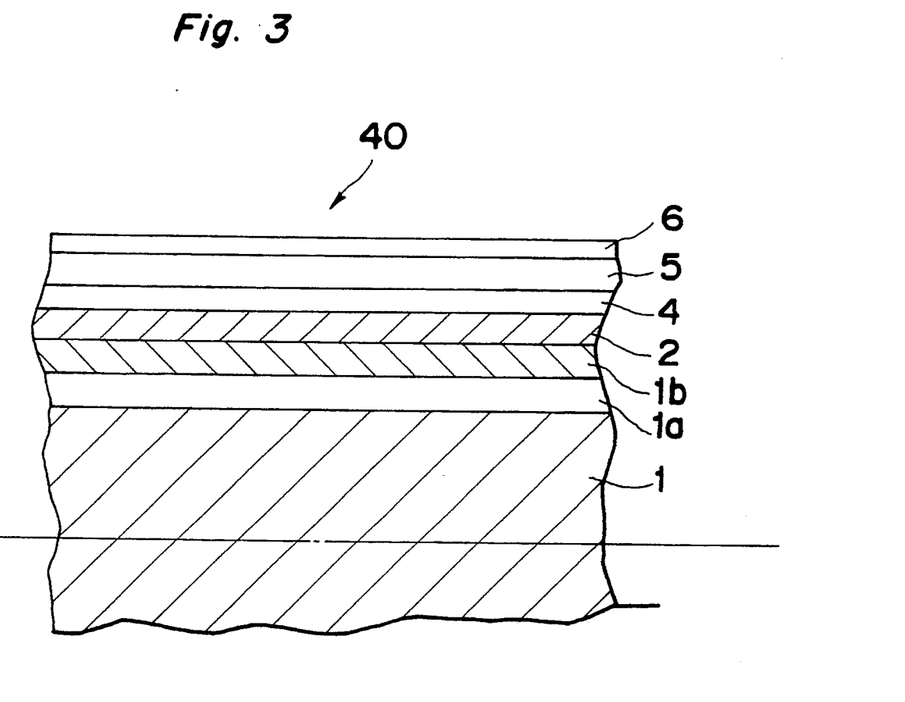
FIG. 3 is a fragmentary sectional view of a hard disk according to a second embodiment of the present invention.

FIG. 3 shows a basic structure of a hard disk 40 according to a second embodiment of the present invention. The hard disk 40 includes a non-magnetic substrate 1, the ferromagnetic metal thin film 2, the filmlike or granular first carbon layer 4, the hard and amorphous second carbon layer 5 and the lubricant layer 6. The substrate 1 has a thickness of about 1.2 mm and is made of aluminums. The substrate 1 includes a Ni—P plating 1a of about 20 μm in thickness and a Cr base 1b of about 2,000 Å in thickness obtained by sputtering. The Cr base 1b is provided on the Ni—P plating 1a so as to improve orientation of the ferromagnetic metal thin film 2. The ferromagnetic metal thin film 2 has a thickness of about 700 Å and is obtained by sputtering a Co—Ni—Cr alloy or the like. The lubricant layer 6 is formed by a wet coating method. Since other constructions of the hard disk 40 is similar to those of the magnetic tape 20, description thereof is abbreviated for the sake of brevity.

Figure 4:
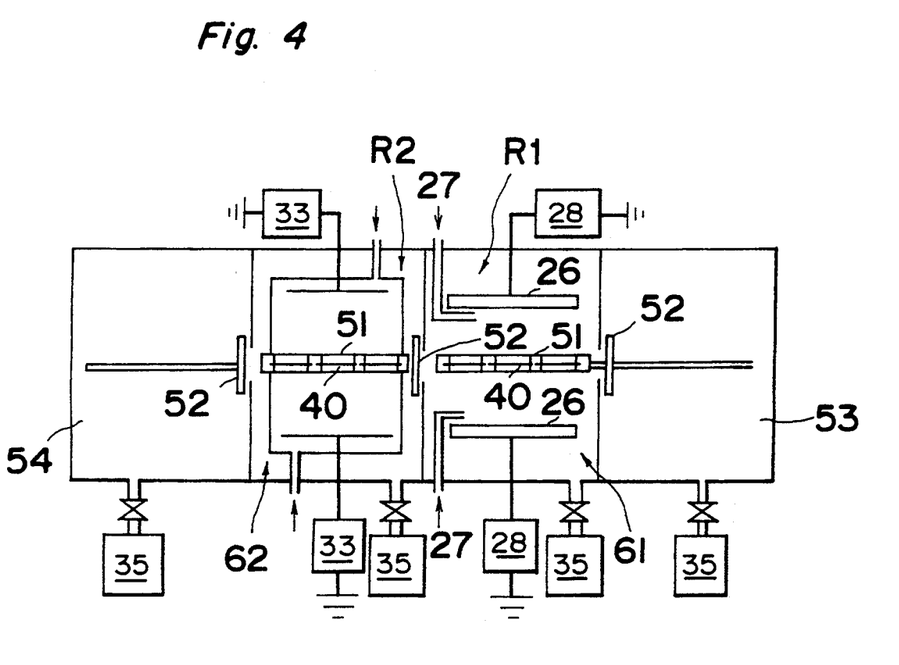
FIG. 4 is a schematic view of an apparatus for producing the hard disk of FIG. 3.

Meanwhile, FIG. 4 shows an apparatus for producing the hard disk 40 of FIG. 3. A marked difference between the apparatuses of FIGS. 2 and 4 resides in that the feed mechanism from the supply roller 21 to the take-up roller 25 in the apparatus of FIG. 2 is replaced by a carrier 51 in the apparatus of FIG. 4. The apparatus of FIG. 4 includes a loading chamber 53, a first processing chamber 61 having the first region R1 for forming the first carbon layer 4, a second processing chamber 62 having the second region R2 for forming the second carbon layer 5 and a discharge chamber 54. The loading chamber 53 is provided for loading the hard disk on the carrier 51, while the discharge chamber 54 is provided for discharging the processed hard disk from the carrier 51. A sluice valve 52 acting as a vacuum seal is provided between neighboring ones of the chambers 53, 61, 62 and 54. Since other constructions of the apparatus of FIG. 4 are similar to those of the apparatus of FIG. 2, description thereof is abbreviated for the sake of brevity.

Operation of the apparatus of the above described arrangement is described with reference to FIG. 4. Initially, the loading chamber 53 is released to atmosphere and a hard disk intermediate formed with up to the metal thin film 2 is loaded on the carrier 51 in the loading chamber 53. Subsequently, when the loading chamber 53 has been evacuated to a predetermined degree of vacuum by the vacuum pump 35, the sluice valve 52 between the loading chamber 53 and the first processing chamber 61 is released such that the carrier 51 mounted with the hard disk intermediate is transported to the first region R1 of the first processing chamber 61. Thereafter, since the filmlike or granular first carbon layer 4 and the hard and amorphous second carbon layer 5 are formed on the hard disk intermediate in exactly the same manner as in the apparatus of FIG. 2, description thereof is abbreviated for the sake of brevity.

Meanwhile, in the hard disk 40 used in a practical performance test, the Ni—P plating 1a of about 20 μm in thickness is formed on a 3.5" aluminum substrate and the Cr base 1b of about 2,000 Å in thickness is formed on the Ni—P plating 1a by sputtering, while the ferromagnetic metal thin film 2 is formed by sputtering a Co—Ni—Cr alloy or the like to a thickness of about 700 Å. The filmlike first carbon layer 4 having a relative intensity of 1.8 to 25 in Raman spectrum, a Vickers hardness of 40 to 1,100 kg/mm$^2$ and a thickness of 8 to 350 Å or the granular first carbon layer 4 having a particle size of 20 to 350 Å, a relative intensity of 1.8 to 25 in Raman spectrum, a Vickers hardness of 80 to 1,100 kg/mm$^2$ and a thickness of 30 to 400 Å is provided on the Cr base 1b. These characteristics of the first carbon layer 4 such as filmlike or granular form, particle size, relative intensity in Raman spectrum and Vickers hardness are obtained by changing such conditions as pressure in the first processing chamber 61, voltage of the sputtering power source 28, distance between the sputtering target 26 and the hard disk 40, temperature of the hard disk 40, etc. Furthermore, the hard and amorphous second carbon layer 5 having a relative intensity of about 1.2 in Raman spectrum, a Vickers hardness of 800 to 4,000 kg/mm$^2$ and a thickness of 30 to 300 Å is provided on the first carbon layer 4. In addition, the lubricant layer 6 having a thickness of about 30 Å and made of carboxylic acid containing fluorine is provided on the second carbon layer 5.

Effects of the hard disk 40 of the present invention are described with reference to Tables 4 to 6 in which by using a commercially available hard disk drive, a contact-start-and-stop (CSS) test is performed for samples 51 to 97 of the hard disk 40 of the present invention and hard disks of comparative examples 5 to 8.

In Table 4 below, characters a, b and c denote the same items as those of Table 1 and character g denotes the number of repetition of the CSS test performed in an environment having a temperature of 5° C. and a humidity of 10%.

In Table 4, the samples 51 to 70 of the hard disk 40 of the present invention include the filmlike first carbon layer 4 having a relative intensity of 1.8 to 25 in Raman spectrum, a Vickers hardness of 40 to 1,100 kg/mm$^2$ and a thickness of 8 to 350 Å and the hard and amorphous second carbon layer 5 having a relative intensity of about 1.2 in Raman spectrum, a Vickers hardness of about 2,500 kg/mm$^2$ and a thickness of about 200 Å. In the hard disk 40, relative intensity in Raman spectrum and Vickers hardness cannot be greatly changed owing to slight interrelation therebetween and thus, are changed in a permissible range.

TABLE 4

| Sample No. | a | b (kg/mm$^2$) | c (Å) | g |
|---|---|---|---|---|
| 51 | 25 | 40 | 150 | 100 |
| 52 | 20 | 50 | 150 | 300 |
| 53 | 15 | 50 | 150 | 500 |
| 54 | 15 | 100 | 150 | 1,000 |
| 55 | 10 | 300 | 150 | 2,000 |
| 56 | 10 | 600 | 150 | 5,000 |
| 57 | 4 | 300 | 150 | 10,000 |
| 58 | 4 | 600 | 8 | 1,000 |
| 59 | 4 | 600 | 10 | 5,000 |
| 60 | 4 | 600 | 60 | 15,000 |
| 61 | 4 | 600 | 50 | >20,000 |
| 62 | 4 | 600 | 150 | >20,000 |
| 63 | 4 | 600 | 300 | 10,000 |
| 64 | 4 | 600 | 350 | 1,000 |
| 65 | 4 | 800 | 150 | >20,000 |
| 66 | 2 | 800 | 150 | 15,000 |
| 67 | 2 | 1,000 | 150 | 10,000 |
| 68 | 2 | 1,100 | 150 | 1,000 |
| 69 | 1.8 | 1,000 | 150 | 500 |
| 70 | 1.8 | 1,000 | 150 | 200 |

Meanwhile, in the CSS test, a slider of the hard disk is made of so-called "altic", i.e. a composite ceramic material of Al$_2$O$_3$ and TiC and is arranged to apply, at a cycle of about 30 sec., a load of about 10 gf to the hard disk rotating at about 3,600 r.p.m. The number g of repetition of the CSS test is determined at the time when the magnetic head is crushed by flaws on the hard disk.

TABLE 5

| Comparative example No. | b (kg/mm$^2$) | c (Å) | g |
|---|---|---|---|
| 5 | <150 | 150 | 200 |
| 6 | <200 | 150 | 50 |
| 7 | 1,500 | 150 | 1,000 |
| 8 | <150 | 150 | 50 |

In the hard disks of the comparative examples 5 to 8 of Table 5 above, the first carbon layer 4 of the present invention is replaced by a plasma-polymerized film, a layer made of graphite, a layer made of metal carbide and a layer made of metal having discontinuous crystalline structure, respectively each having a thickness of 150 Å but the hard and amorphous second carbon layer 5 and the lubricant layer 6 are provided in the same manner as in the hard disk 40 of the present invention.

In Table 6 below, the samples 71 to 97 of the hard disk 40 of the present invention include the granular first carbon layer 4 having a particle size of about 20 to 350 Å, a relative intensity of 1.8 to 20 in Raman spectrum, a Vickers hardness of 80 to 1,100 kg/mm$^2$ and a thickness of 30 to 400 Å and the hard and amorphous second carbon layer 5 having a relative intensity of about 1.2, a Vickers hardness of about 2,500 kg/mm$^2$ and a thickness of about 200 Å.

TABLE 6

| Sample No. | f (Å) | a | b (kg/mm$^2$) | c (Å) | g |
|---|---|---|---|---|---|
| 71 | 20 | 4 | 600 | 30 | 200 |
| 72 | 30 | 4 | 600 | 40 | 500 |
| 73 | 50 | 4 | 600 | 60 | 10,000 |
| 74 | 50 | 2 | 800 | 60 | 5,000 |
| 75 | 100 | 20 | 80 | 150 | 300 |
| 76 | 100 | 15 | 80 | 150 | 500 |
| 77 | 100 | 15 | 100 | 150 | 3,000 |
| 78 | 100 | 10 | 300 | 150 | 10,000 |
| 79 | 100 | 4 | 300 | 150 | 15,000 |
| 80 | 100 | 4 | 600 | 100 | >20,000 |

TABLE 6-continued

| Sample No. | f (Å) | a | b (kg/mm²) | c (Å) | g |
|---|---|---|---|---|---|
| 81 | 100 | 4 | 600 | 150 | >20,000 |
| 82 | 100 | 4 | 600 | 200 | 15,000 |
| 83 | 100 | 4 | 600 | 350 | 10,000 |
| 84 | 100 | 4 | 600 | 400 | 1,000 |
| 85 | 100 | 4 | 800 | 150 | >20,000 |
| 86 | 100 | 4 | 800 | 200 | 15,000 |
| 87 | 100 | 2 | 600 | 150 | >20,000 |
| 88 | 100 | 2 | 800 | 150 | 15,000 |
| 89 | 100 | 2 | 1,000 | 150 | 5,000 |
| 90 | 100 | 2 | 1,100 | 150 | 2,000 |
| 91 | 100 | 1.8 | 800 | 150 | 1,000 |
| 92 | 100 | 1.8 | 1,000 | 150 | 500 |
| 93 | 100 | 1.8 | 1,100 | 150 | 200 |
| 94 | 200 | 4 | 600 | 250 | >20,000 |
| 95 | 300 | 4 | 600 | 350 | 15,000 |
| 96 | 300 | 4 | 600 | 400 | 5,000 |
| 97 | 350 | 4 | 600 | 400 | 1,000 |

In Table 6 above, character f denotes the same item as that of Table 3.

It will be seen from Tables 4 and 5 that when the filmlike first carbon layer 4 of the hard disk 40 has a relative intensity of 2 to 15 in Raman spectrum, a Vickers hardness of 100 to 1,000 kg/mm² and a thickness of 10 to 300 Å, the hard disk 40 of the present invention is superior, in the CSS test, to the hard disks of the comparative examples 5 to 8.

Therefore, in the hard disk 40, it is preferable that the filmlike first carbon layer 4 has a relative intensity of 2 to 15 in Raman spectrum, a Vickers hardness of 100 to 1,000 kg/mm² and a thickness of 10 to 300 Å. Meanwhile, in view of allowance of the CSS characteristics, spacing loss due to the protective film, etc., it is more preferable that the filmlike first carbon layer 4 has a relative intensity of 2 to 10 in Raman spectrum, a Vickers hardness of 300 to 800 kg/mm² and a thickness of 10 to 200 Å.

Table 6 shows that the CSS characteristics of the hard disk 40 are excellent when the granular first carbon layer 4 of the hard disk 40 has a particle size of 20 to 300 Å, a relative intensity of 2 to 15 in Raman spectrum and a Vickers hardness of 100 to 1,000 kg/mm². When the granular first carbon layer 4 has a particle size of not less than 300 Å and a thickness of not less than 350 Å, the CSS characteristics of the hard disk 40 deteriorate.

Therefore, in the hard disk 40, it is preferable that the granular first carbon layer 4 has a particle size of 20 to 300 Å, a relative intensity of 2 to 15 in Raman spectrum, a vickers hardness of 100 to 1,000 kg/mm² and a thickness of 30 to 350 Å. Meanwhile, in view of allowance of the CSS characteristics, spacing loss due to the protective film, etc., it is more preferable that the granular first carbon layer 4 has a particle size of 30 to 200 Å, a relative intensity of 2 to 10 in Raman spectrum, a Vickers hardness of 300 to 800 kg/mm² and a thickness of 30 to 200 Å.

Meanwhile, relative intensity in Raman spectrum and hardness of the filmlike or granular first carbon layer 4 should be set such that the first carbon layer 4 has active points enabling chemical bonding between the first carbon layer 4 and the hard and amorphous second carbon layer 5 at the time of formation of the second carbon layer 5 on the first carbon layer 4. It is surmised that when relative intensity in Raman spectrum of the first carbon layer 4 is not more than 2 or rickets hardness of the first carbon layer 4 exceeds 1,000 kg/mm², stability of surface of the first carbon layer 4 is improved, thereby resulting in drop of adhesive strength of the first carbon layer 4.

From the foregoing, since the first carbon layer 4 reaches the metal thin film 2 at high energy, the first carbon layer 4 not only is chemically bonded to the ferromagnetic metal thin film 2 partially but is mechanically bonded to the ferromagnetic metal thin film 2 strongly. Meanwhile, since the first carbon layer 4 and the hard and amorphous second carbon layer 5 are chemically bonded to each other in carbon, the second carbon layer 5 is bonded to the metal thin film 2 quite strongly through the first carbon layer 4. As a result, the CSS characteristics of the hard disk are improved. Furthermore, since metal is not drawn into the hard and amorphous second carbon layer 4, agglutination of metal to the magnetic head does not take place and thus, head crush does not take place, thereby resulting in improvement of the CSS characteristics of the hard disk.

In the samples 51 to 97 of Tables 4 and 6, the hard and amorphous second carbon layer 5 has a relative intensity of about 1.2 in Raman spectrum, a Vickers hardness of about 2,500 kg/mm² and a thickness of about 200 Å. However, in the samples 51 to 97, the second carbon layer 5 may have a relative intensity of 0.8 to 3 in Raman spectrum, a Vickers hardness of not less than 1,000 kg/mm² and a thickness of 100 to 300 Å.

Meanwhile, in both the first and second embodiments of the present invention, the first carbon layer 4 is formed by sputtering or plasma CVD. However, a filmlike or granular carbon layer having properties similar to those of the first carbon layer 4 of the first and second embodiments of the present invention can also be obtained by ionization deposition or cluster ionization deposition of carbon.

Figure 5:
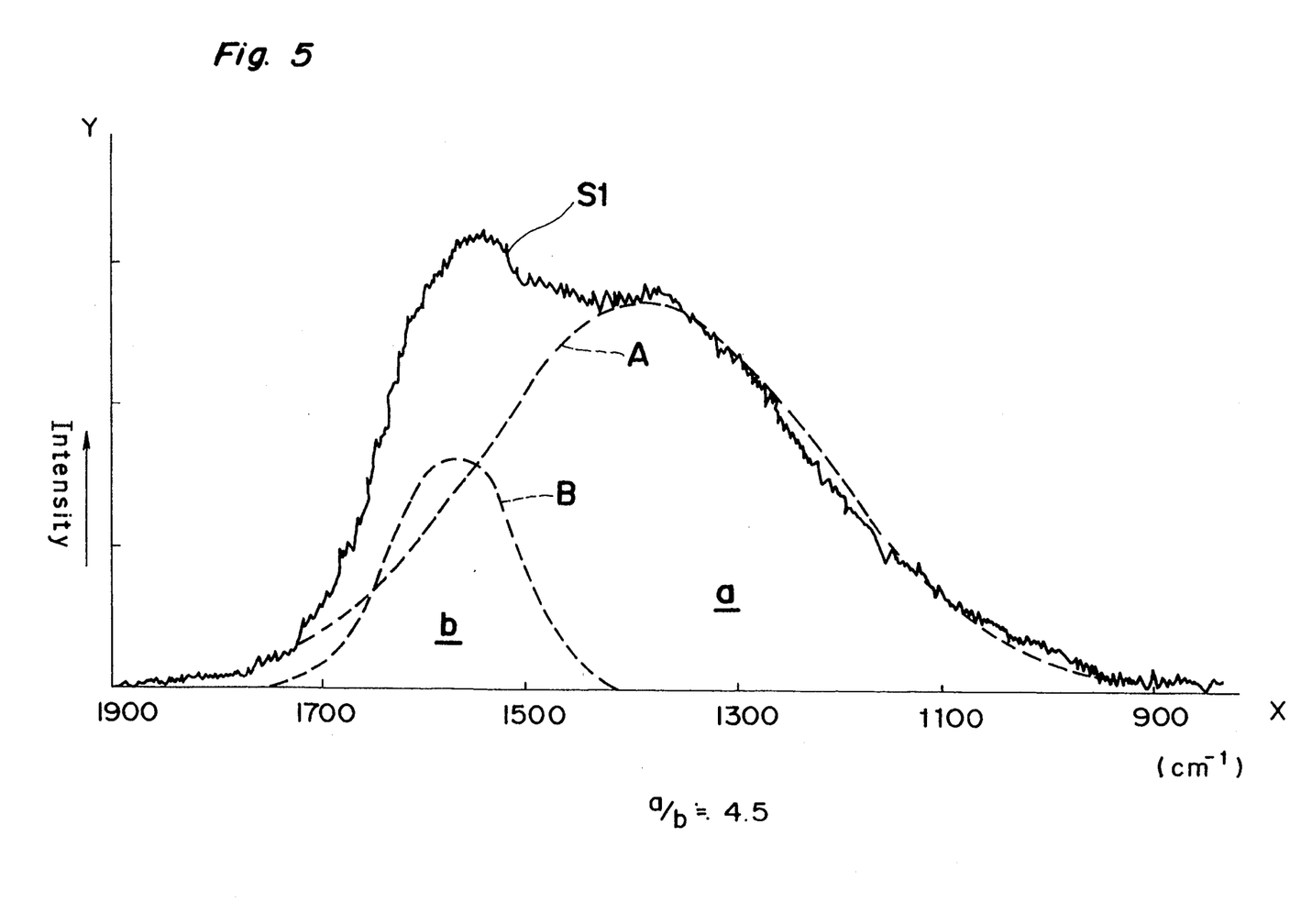
FIG. 5 is a graph showing Raman spectrum of a first carbon layer of the present invention.
Figure 6:
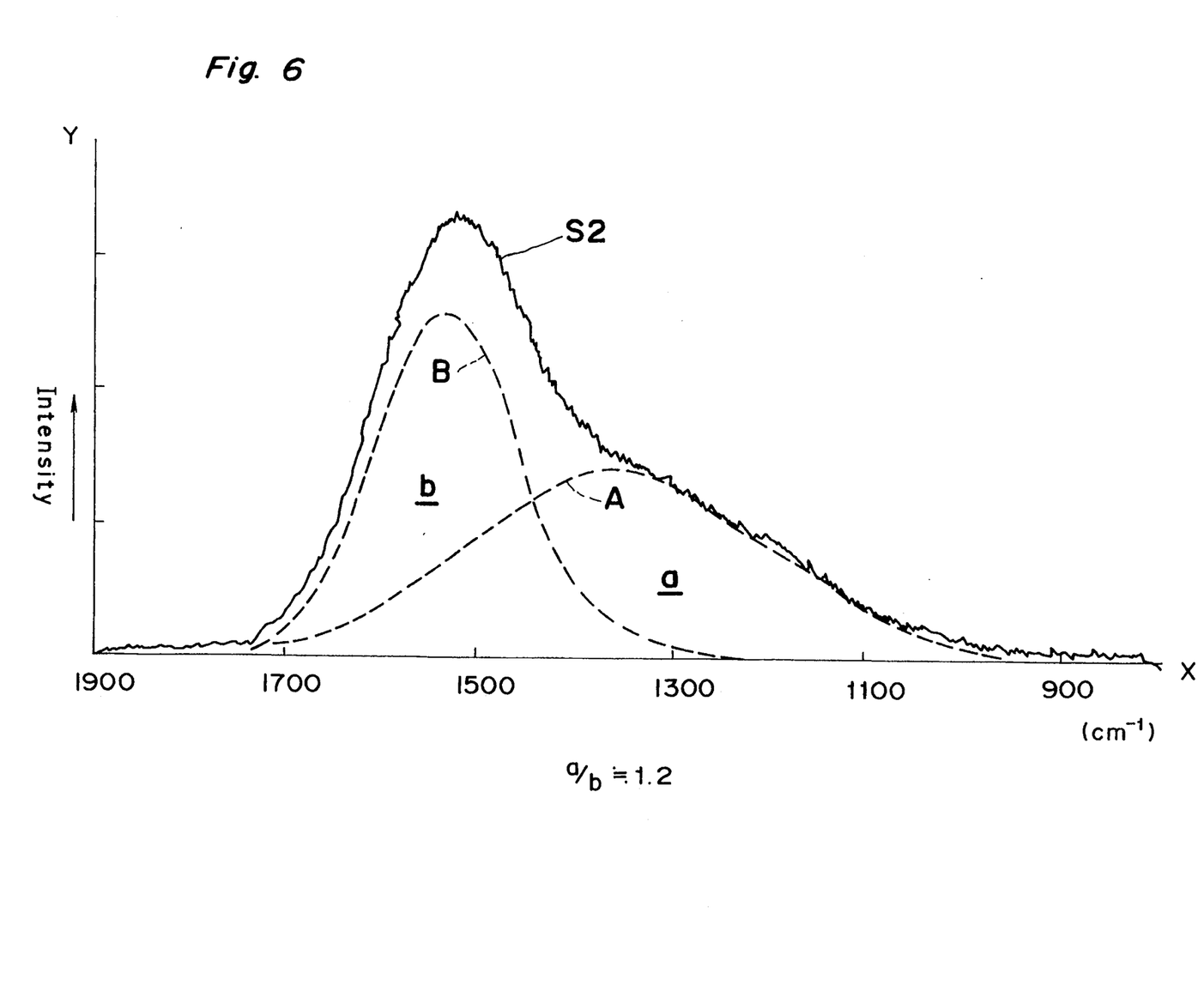
FIG. 6 is a graph showing Raman spectrum of a second carbon layer of the present invention.

Furthermore, FIGS. 5 and 6 are graphs of rectangular coordinates having an axis X of abscissas expressed in $cm^{-1}$ and an axis Y of ordinates indicative of spectral intensity. Based on Raman spectrophotometry, FIG. 5 shows a Raman spectrum S1 of the granular first carbon layer 4 having a Vickers hardness of about 600 kg/mm², while FIG. 6 shows a Raman spectrum S2 of the hard and amorphous second carbon layer 5 having a Vickers hardness of about 2,500 kg/mm². In FIG. 5, the Raman spectrum S1 is decomposed into a band A of Gaussian function having a peak in the vicinity of 1380 $cm^{-1}$ and a band B of Gaussian function having a peak in the vicinity of 1550 $cm^{-1}$. Assuming that character a denotes an area enclosed by the band A and the axis X and character b denotes an area enclosed by the band B and the axis X, a ratio (a/b) is nearly equal to 4.5. This ratio (a/b) represents "relative intensity in Raman spectra" referred to above frequently. Therefore, the Raman spectrum S1 has a relative intensity of about 4.5.

Likewise, in FIG. 6, the Raman spectrum S2 is decomposed into the bands A and B and the ratio (a/b) is nearly equal to 1.2. Therefore, the Raman spectrum S2 has a relative intensity of about 1.2.

From FIGS. 5 and 6, it is concluded that as hardness of the carbon layer is increased, relative intensity in Raman spectrum decreases further and tetrahedral ($sp^3$) property of the carbon layer rises more.

What is claimed is:

1. A magnetic recording medium comprising:
   a non-magnetic substrate;
   a ferromagnetic metal thin film which is provided on the non-magnetic substrate;

a first carbon layer which is provided on the ferromagnetic metal thin film; and a hard and amorphous second carbon layer which is provided on the first carbon layer;

the first and second carbon layers having first and second Raman spectra based on Raman spectrophotometry, respectively;

such that when each of the first and second Raman spectra when depicted in a graph of rectangular coordinates having an x and y axis such that the x axis expressed in $cm^{-1}$ the y axis is indicative of spectral intensity, said Raman spectra being separated into a first band of Gaussian function having a peak of about 1380 $cm^{-1}$ and a second band of Gaussian function having a peak of about 1550 $cm^{-1}$, a ratio f an area enclosed by the first band and the x axis to an area enclosed by the second band and the x axis represents "relative intensity", said first carbon layer has a relative intensity of 2 to 20 and a Vickers hardness of 50 to 1,000 $kg/mm^2$, while the second carbon layer has a relative intensity of 0.8 to 3, a Vickers hardness of not less than 1,000 $kg/mm^2$ and a thickness of 50 to 300 Å.

2. A magnetic recording medium as claimed in claim 1, wherein the first carbon layer has a thickness of 5 to 300 Å.

* * * * *